M. C. WILLS.
ADJUSTABLE DRAFT MECHANISM.
APPLICATION FILED MAR. 3, 1919.
1,408,672.
Patented Mar. 7, 1922.
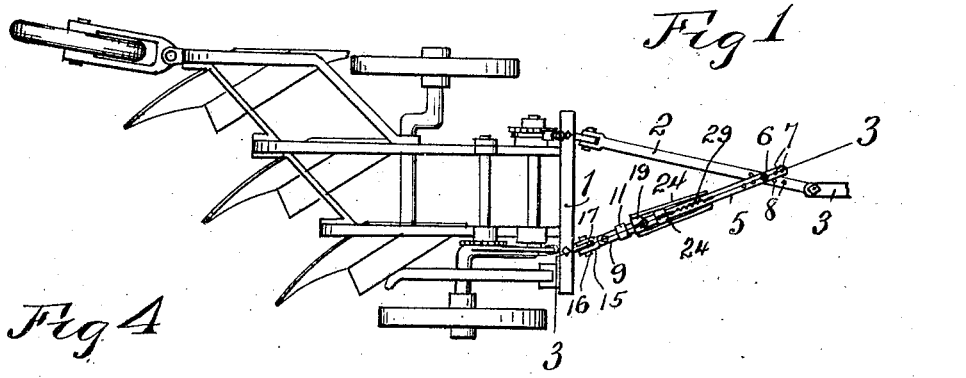
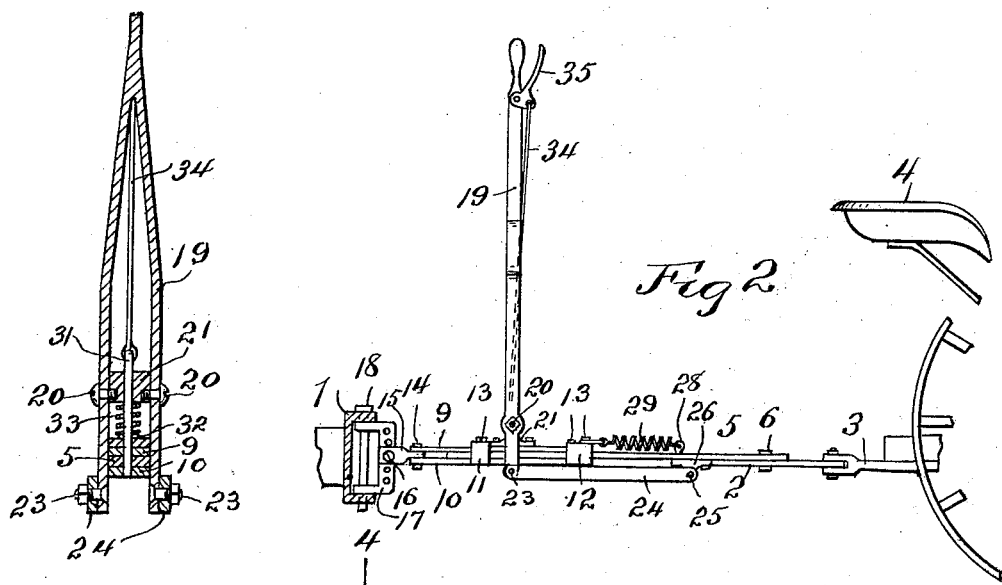
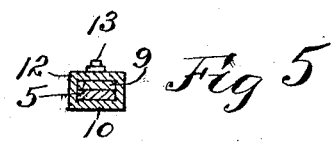
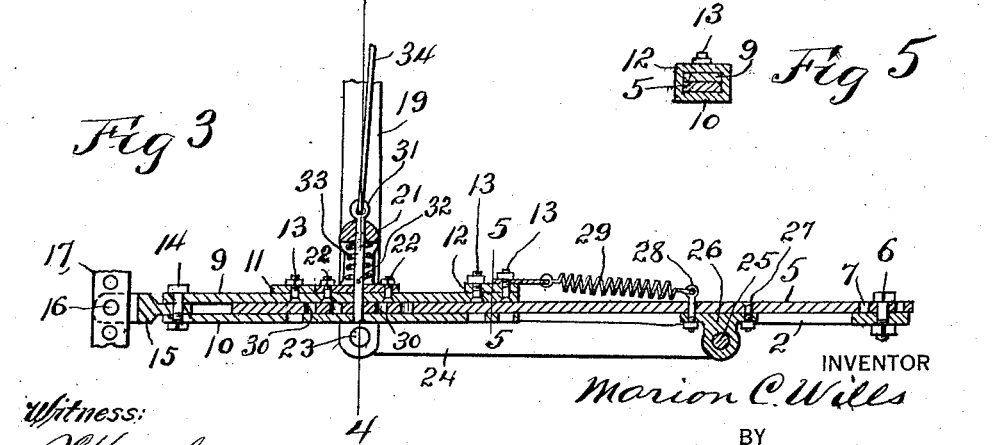
Witness:
R. E. Hamilton
INVENTOR
Marion C. Wills
BY
Warren D. House
His ATTORNEY

UNITED STATES PATENT OFFICE.

MARION C. WILLS, OF PLATTE CITY, MISSOURI.

ADJUSTABLE DRAFT MECHANISM.

1,408,672.	Specification of Letters Patent.	Patented Mar. 7, 1922.

Application filed March 3, 1919. Serial No. 280,218.

*To all whom it may concern:*

Be it known that I, MARION C. WILLS, a citizen of the United States, residing at Platte City, in the county of Platte and State of Missouri, have invented a certain new and useful Improvement in Adjustable Draft Mechanisms, of which the following is a specification.

My invention relates to improvements in adjustable draft mechanisms. It is particularly well adapted for use with tractor drawn plows.

The object of my invention is to provide a novel draft mechanism, by which the line of draft of a tractor drawn plow or other device is adapted to be quickly and easily laterally shifted to accommodate the plow to hillside work.

My invention provides further novel means by which the operator while occupying the seat on the tractor may easily and quickly change the line of draft of a plow drawn by the tractor.

The novel features of my invention are hereinafter fully described and claimed.

In the accompanying drawing which illustrates the preferred embodiment of my invention, Fig. 1 is a plan view of a tractor drawn plow provided with my invention.

Fig. 2 is a side elevation of my improvement, shown connected to a tractor and plow, portions of which are shown.

Fig. 3 is an enlarged vertical sectional view on the line 3—3 of Fig. 1.

Fig. 4 is a vertical sectional view on the line 4—4 of Fig. 3.

Fig. 5 is a cross section on the line 5—5 of Fig. 3.

Similar reference characters designate similar parts in the different views.

1 designates the draft member of a frame of an ordinary gang plow, to which is attached the rear end of a forwardly extending draw bar 2.

The forward end of the draw bar 2 is pivotally attached to the rear end of a draw bar 3, which is attached to and projects rearwardly from the frame, not shown, of a tractor of any ordinary type having a seat 4 at the rear thereof.

Co-operating with the draw bar 2 for changing the line of draft laterally and for drawing the plow is provided longitudinally extensible means, preferably adapted to be extended or contracted by an operator occupying the seat 4. This means comprises, preferably, the following described parts.

A draft bar 5 is pivotally connected adjacent to its forward end by a vertical bolt 6 to the bar 2. The bolt 6 is adapted to be inserted through any one of a longitudinal row of holes 7 in the bar 5 and through any one of a longitudinal row of holes 8 in the bar 2.

The bar 5 is longitudinally slidable between two parallel bars 9 and 10, disposed one above the other, the draft bar 10 being provided with two integral loops 11 and 12, in which the bar 9 is mounted and to which the bar 9 is secured by means of vertical bolts 13.

A vertical bolt 14 extends through the bars 9 and 10 adjacent to the rear ends thereof and also through a casting 15, which is pivoted by means of a transverse bolt 16 to a vertical U-shaped member 17, which is pivoted by a vertical bolt 18 to the draft member 1.

For sliding the bar 5 longitudinally between the bars 9 and 10, I provide a lever 19 which is pivoted by means of transverse screws 20 to a bracket 21, which is secured to the upper side of the bar 9 by means of vertical bolts 22.

The lower end of the lever 19 is bifurcated, the arms of which are pivoted at their lower ends by means of transverse bolts 23 to the rear ends of two forwardly extending parallel bars 24, the forward ends of which are pivoted by means of a transverse bolt 25 to a plate 26 which is secured by vertical bolts 27 and 28 to the under side of the plate 5.

For exerting a pulling tension tending to draw the member 9 forwardly, a coil draft spring 29 has its forward end attached to the bolt 28 and its rear end attached to the forward bolt 13.

For locking the bar 5 in the position to which it may be adjusted, it is provided with a longitudinal row of vertical holes 30, either of which is adapted to receive the lower end of a vertical bolt 31, which is slidably mounted in the bracket 21 and which extends through and is slidable in the plates 9 and 10.

For normally forcing the bolt 31 downwardly, there is provided a coil spring 33 which encircles the bolt 31 and bears at its upper end against the bracket 21 and at its lower end against a transverse pin 32 mounted in the bolt 31.

For drawing the bolt 31 upwardly out of engagement with the bar 5, it has pivotally attached to its upper end the lower end of a rod 34, the upper end of which is pivoted to a bell crank lever 35, which is pivoted in the usual manner to the lever 19 adjacent to the upper end thereof.

The operator occupying the seat 4 by operating the bell crank lever 35, which is within easy reach from the seat 4, withdraws the bolt 31 upwardly out of the bar 5, thereby permitting the bar 5 to be moved longitudinally by means of the lever 19 and the bars 24, when the lever is swung. If it is desired to slide the bar 5 rearwardly between the bars 9 and 10, so as to contract the draft mechanism, the upper end of the lever 19 is drawn forwardly.

This shifts the line of draft to the left with relation to the tractor. By swinging the upper end of the lever 19 rearwardly, the bar 5 is moved forwardly with respect to the bars 9 and 10, thus extending the draft device and shifting the line of draft to the right with relation to the tractor.

When the lever 19 has been adjusted to the proper position, the bell crank lever 35 is released, thus permitting the coil spring 33 to force the bolt 31 through the adjacent hole 30 and into the bar 10, thereby locking the bar 5 in its adjusted position.

The spring 29 assists in contracting the draft mechanism against the draft exerted by the plow, when the device is operated with the tractor drawing the plow ahead.

In plowing on a hillside, which slopes to the right, as looking ahead with respect to the line of draft, the tendency of the plow is to work to the right, and to overcome this, it is desired to shift the line of draft laterally to the left, which is accomplished by contracting the draft mechanism by drawing forwardly the upper end of the lever 19. If the hillside slopes to the left, the upper end of the lever 19 is swung rearwardly, thus lengthening the draft mechanism, thereby shifting the line of draft to the right. It will be noted that the locking bolt 31 locks the bars 9 and 10 to the draft bar 5 independently of the lever 19, so that the latter is not affected by the pulling strain exerted by the draft bars wholly upon the bolt 31. This eliminates liability of breaking excepting through the single bolt 31.

I do not limit my invention to the structure shown and described, as modifications, within the scope of the appended claims, may be made without departing from the spirit of my invention.

What I claim is:

1. In an adjustable draft mechanism, the combination with a draft member, of a draw bar pivoted thereto and adapted to be attached to a draw bar of a tractor, two draft bars longitudinally adjustable with respect to each other, one of said draft bars being attached to said draw bar and the other draft bar being attached to said draft member, a draft spring connecting said draft bars and adapted to pull part of the load, means for moving said draft bars longitudinally with respect to each other, and releasable means for locking said bars together in the different position to which they may be adjusted, substantially as set forth.

2. In an adjustable mechanism, the combination with a draft member, of a draw bar pivoted thereto, two draft bars respectively attached to said draft member and said draw bar and longitudinally adjustable with respect to each other, a lever pivotally supported on one of said draft bars, a link connecting said lever with the other draft bar, and a locking bolt arranged to be extended through said draft bars in the different positions in which they may be adjusted with respect to each other and arranged to lock said draft bars together independently of said lever, substantially as set forth.

In testimony whereof I have signed my name to this specification.

MARION C. WILLS.